United States Patent [19]

Langeneckert

[11] Patent Number: 4,961,487
[45] Date of Patent: Oct. 9, 1990

[54] VIBRATION DAMPING APPARATUS

[75] Inventor: Hermann Langeneckert, Appenweier, Fed. Rep. of Germany

[73] Assignee: Luk Lamellen und Kupplungsbau GmbH, Bühl, Fed. Rep. of Germany

[21] Appl. No.: 328,925

[22] Filed: Mar. 27, 1989

[30] Foreign Application Priority Data

Mar. 26, 1988 [DE] Fed. Rep. of Germany ....... 3810433

[51] Int. Cl.⁵ .................................................. F16D 3/66
[52] U.S. Cl. ................................... 192/106.2; 74/574
[58] Field of Search ................ 74/574; 464/66, 68; 192/106.2, 106.1

[56] References Cited

U.S. PATENT DOCUMENTS

| | | | |
|---|---|---|---|
| 1,467,732 | 9/1923 | Litle | 192/106.1 |
| 1,893,486 | 1/1933 | Black | 464/66 |
| 4,185,728 | 1/1980 | Gatewood | 464/68 X |
| 4,470,494 | 9/1984 | Takeuchi | 464/68 X |
| 4,564,097 | 1/1986 | Kabayama | 464/68 X |
| 4,727,767 | 3/1988 | Aiki et al. | 74/574 |
| 4,732,250 | 3/1988 | Maucher et al. | 192/70.17 |
| 4,777,843 | 10/1988 | Bopp | 74/574 |
| 4,783,895 | 11/1988 | Reik | 29/434 |

FOREIGN PATENT DOCUMENTS 0034026 2/1984 Japan ............................. 192/106.1
2193790 2/1988 United Kingdom ............. 192/106.2

*Primary Examiner*—Rodney H. Bonck
*Attorney, Agent, or Firm*—Peter K. Kontler

[57] ABSTRACT

Vibration damping apparatus for use in the power train between the engine and the variable-speed transmission of a motor vehicle has a first flywheel connectable to the engine, a second flywheel connectable to the input shaft of the transmission by a friction clutch, one or more dampers between the flywheels, and an axial plug-in coupling between the parts which are carried by the first flywheel and the parts which are carried by the second flywheel. The coupling has radially extending first profiles which are carried by the first flywheel and radially extending second profiles which are carried by the second flywheel and mate with the first profiles to transmit torque when the engine is running. In order to reduce rattling or other types of noise when the engine is idling while the clutch is engaged and the transmission is not shifted into a forward or reverse gear, the first and second profiles are braced against other by coil springs or by other types of resilient bracing members in a direction in which the first profiles transmit torque to the second profiles when the engine drives the first flywheel and the first flywheel rotates the second flywheel by way of one or more dampers.

23 Claims, 5 Drawing Sheets

VIBRATION DAMPING APPARATUS

CROSS-REFERENCE TO RELATED CASE

The vibration damping apparatus of the present invention embodies certain features which are disclosed and claimed in commonly owned copending patent application Serial No. 328933 filed Mar. 27, 1989 by Johann Jackel for "Vibration damping apparatus".

BACKGROUND OF THE INVENTION

The invention relates to improvements in vibration damping apparatus in general, and more particularly to improvements in apparatus for damping vibrations in power trains between the engines and variable-speed transmissions of motor vehicles. Still more particularly, the invention relates to improvements in vibration damping apparatus of the type wherein coaxial rotary flywheels can turn relative to each other against the opposition of one or more dampers.

It is known to connect a first flywheel of a composite flywheel in a vibration damping apparatus to the output shaft of an internal combustion engine, to connect a second flywheel of the composite flywheel with the input shaft of a variable-speed transmission which transmits torque to the wheels of the motor vehicle, to install a friction clutch between the second flywheel and the input shaft of the transmission, and to equip the damper or dampers with (a) one or more energy storing elements which are designed to store energy when the first flywheel is caused to turn relative to the second flywheel and/or vice versa, (b) with an input element, and (c) with an output element. One of the input and output elements is non-rotatably but axially movably coupled to one of the flywheels by means of a plug-in coupling which includes first profiles on the one element or on the one flywheel and second profiles provided on the one flywheel or on the one element and serving to transmit torque from the one flywheel to the one element or vice versa. Reference may be had to numerous United States and foreign patents and patent applications of the assignee of the present application.

An important advantage of a plug-in coupling in a vibration damping apparatus of the above outlined character is that it facilitates assembly and dismantling of the apparatus because each flywheel and the associated parts can be assembled into a discrete unit, and the two units are thereupon connected to each other by bringing the first profiles of the plug-in coupling into mesh with the second profiles. The two units are in requisite torque-transmitting engagement as soon as the first profiles are properly positioned with reference to the second profiles of the coupling.

In many types of vibration damping apparatus which are designed for use in power trains between the engines and variable-speed transmissions of motor vehicles and wherein two separately assembled units can be simply inserted into each other in order to establish a torque-transmitting connection by way of a so-called plug-in coupling, one or more parts frequently necessitate highly accurate mounting with a minimum of tolerances. For example, one or more parts of such apparatus must be received in channels or like spaces with a minimum of play in order to enhance the operation of the assembled operatus and/or to prolong the useful life of its parts. Ths holds especially true when a substantially flange-like radially disposed component must extend into an annular chamber which contains a supply of viscous liquid and the apparatus comprises means for expelling the confined liquid from one portion of the chamber into another portion when the two flywheels are caused to turn relative to each other. The quality of the viscous damping action depends to a great extent on the selection of flow restricting passages for the liquid, i.e., on the cross-sectional area of each clearance or gap for the flow of viscous liquid therethrough. The plug-in coupling ensures that the flange can actually float between the parts which flank the gap (in the axial direction of the apparatus), i.e., the flange can assume an optimum axial position for proper operation of the vibration damping apparatus. Proper operation is ensured if the flange does not bear against the parts which define the gap so that it does not jam or become clamped at a time when it should be free to turn with reference to the gap-defining parts. Thus, elimination or pronounced reduction of friction between the flange and the adjacent parts is a highly desirable feature of a properly assembled vibration damping apparatus.

A drawback of presently known vibration damping apparatus which embody plug-in type axial couplings of the above outlined character is that, due to unavoidable or necessary manufacturing tolerances, the profiles of the coupling are assembled with a certain amount of play which causes the generation of undesirable noise (known as chatter, rattling or clatter), especially during certain stages of operation of the engine and of the power train, for example, when the engine is idling, the clutch between the composite flywheel and the transmission is engaged and the transmission is not shifted into a forward or reverse gear.

OBJECTS OF THE INVENTION

An object of the invention is to provide a novel and improved vibration damping appartus which does not generate appreciable rattling, clattering or other noise at any stage of its operation.

Another object of the invention is to provide an apparatus which does not generate excessive noise when the engine is idling while the clutch is engaged and the transmission is not shifted into a forward or reverse gear.

A further object of the invention is to provide a novel and improved method of reducing or eliminating noise during operation of a vibration damping apparatus in the power train between the engine and the variable-speed transmission of a motor vehicle.

An additional object of the invention is to provide a novel and improved axial plug-in type coupling for use in the above outlined vibration damping apparatus.

Still another object of the invention is to provide the vibration damping apparatus with novel and improved means for eliminating or reducing noise in a simple and inexpensive way.

A further object of the invention is to provide a power train which embodies the above outlined vibration damping apparatus.

Another object of the invention is to provide a motor vehicle which embodies the above outlined vibration damping apparatus.

An additional object of the invention is to provide the vibration damping apparatus with novel and improved bracing means for the component parts of the plug-in coupling.

SUMMARY OF THE INVENTION

The invention is embodied in an apparatus for damping vibrations in the power train between an engine and an input component of a transmission in a motor vehicle. The improved apparatus comprises a first flywheel which is connectable with the engine (e.g., with the crankshaft of an internal combustion engine), and a second flywheel which is connectable with the input component of the transmission, particularly by way of a friction clutch. The two flywheels are angularly movable relative to each other, and the apparatus further comprises vibration damping means operating between the two flywheels and comprising at least (a) energy storing means serving to store energy in response to angular movement of at least one of the flywheels relative to the other flywheel, (b) an input element, (c) an output element, and (d) plug-in means for non-rotatably but axially movably coupling one of the input and output elements with one of the flywheels. The coupling means comprises first profiles, second profiles adjacent the first profiles, and means for bracing (i.e., biasing or urging) the first and second profiles against each other in the circumferential direction of the flywheels.

The bracing moment is preferably greater than (a) the moments which develop as a result of variations of angular velocity due to non-uniformity of rotary movement of the output shaft of the engine, and (b) the moment of inertia of the second flywheel. The arrangement is preferably such that the bracing moment of the coupling means is greater than (a) the moments which develop as a result of changes of angular velocity due to non-uniformity of rotary movement of the engine, and (b) the combined moment of inertia of the second flywheel and of all parts which share angular movements of the second flywheel. Such parts include the friction clutch between the second flywheel and the input component of the transmission and the masses which rotate with the input component.

The bracing moment of the coupling means is preferably in the range of 5 to 30 Nm, most preferably between 8 to 20 Nm.

The bracing means can include energy storing members which are disposed in the regions between the first and second profiles of the coupling means. The first and second profiles can have substantially radially extending flanks, and the energy storing members of the bracing means can be disposed in the regions of such radial flanks.

The output element of the vibration damping means can comprise a flange having a centrally located opening and an internal surface surrounding the opening and bounding the first profiles. The second profiles can be carried by the second flywheel. More specifically, the vibration damping means can further comprise a substantially disc-shaped member which is connected with the second flywheel and has peripheral portion provided with the second profiles. The output element can comprise means for stressing the energy storing elements.

The vibration damping means can be composed of at least one damper which is elastic in the circumferential direction of the flywheels, and a slip clutch which is in series with the damper. The output element can constitute the output element of the slip clutch, and the first profiles are then carried by the output element.

The first profiles can include first radial projections, and the second profiles can include second projections which mate with or are in a similar torque-transmitting engagement with the first projections under the action of the bracing means. At least the first or at least the second projections can be provided with sockets, and the bracing means can comprise an energy storing member in each socket. Each projection can have a radial flank, and the sockets can be provided in the radial flanks of the respective projections. Each socket can include a hole or bore which extends substantially circumferentially of the flywheels, and each energy storing member can comprise or constitute a coil spring. Each projection which is provided with a bore or hole has a bottom surface in its bore or hole, and each coil spring preferably reacts against the corresponding bottom surface and bears against the projection which is adjacent the respective bore-containing projection.

The flanks of the profiles preferably tend to bear against each other when the motor vehicle is coasting, and the bracing means then includes means for urging the flanks apart. The flanks of the first and second profiles preferably transmit torque between the first and second profiles when the engine drives the flywheels (i.e., when the vehicle is not coasting), and the bracing means includes means for urging the flanks against each other. The bracing means can be provided in the first and/or in the second profiles.

The novel features which are considered as characteristic of the invention are set forth in particular in the appended claims. The improved vibration damping apparatus itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
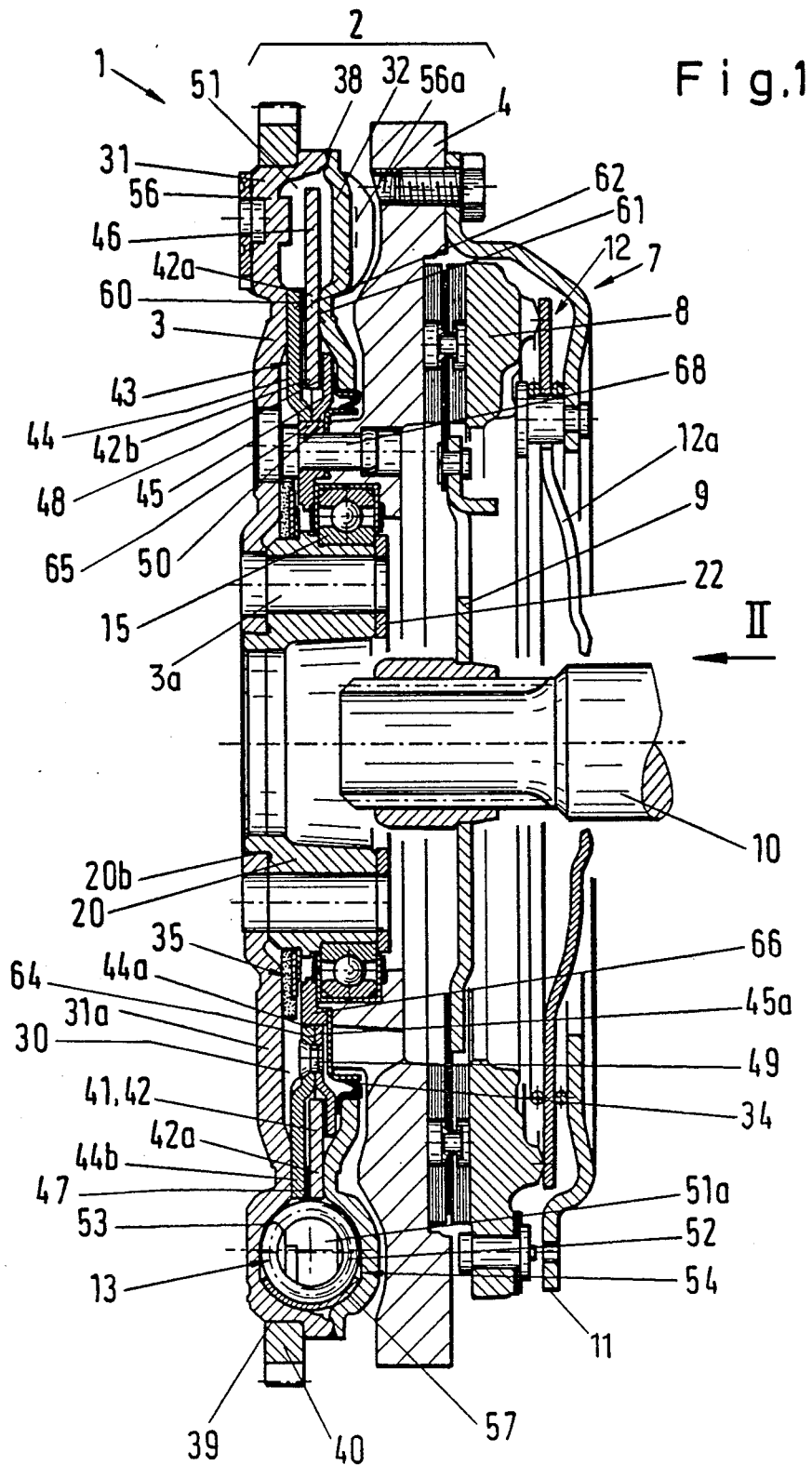
FIG. 1 is an axial sectional view of a vibration damping apparatus which embodies one form of the invention.
Figure 2:
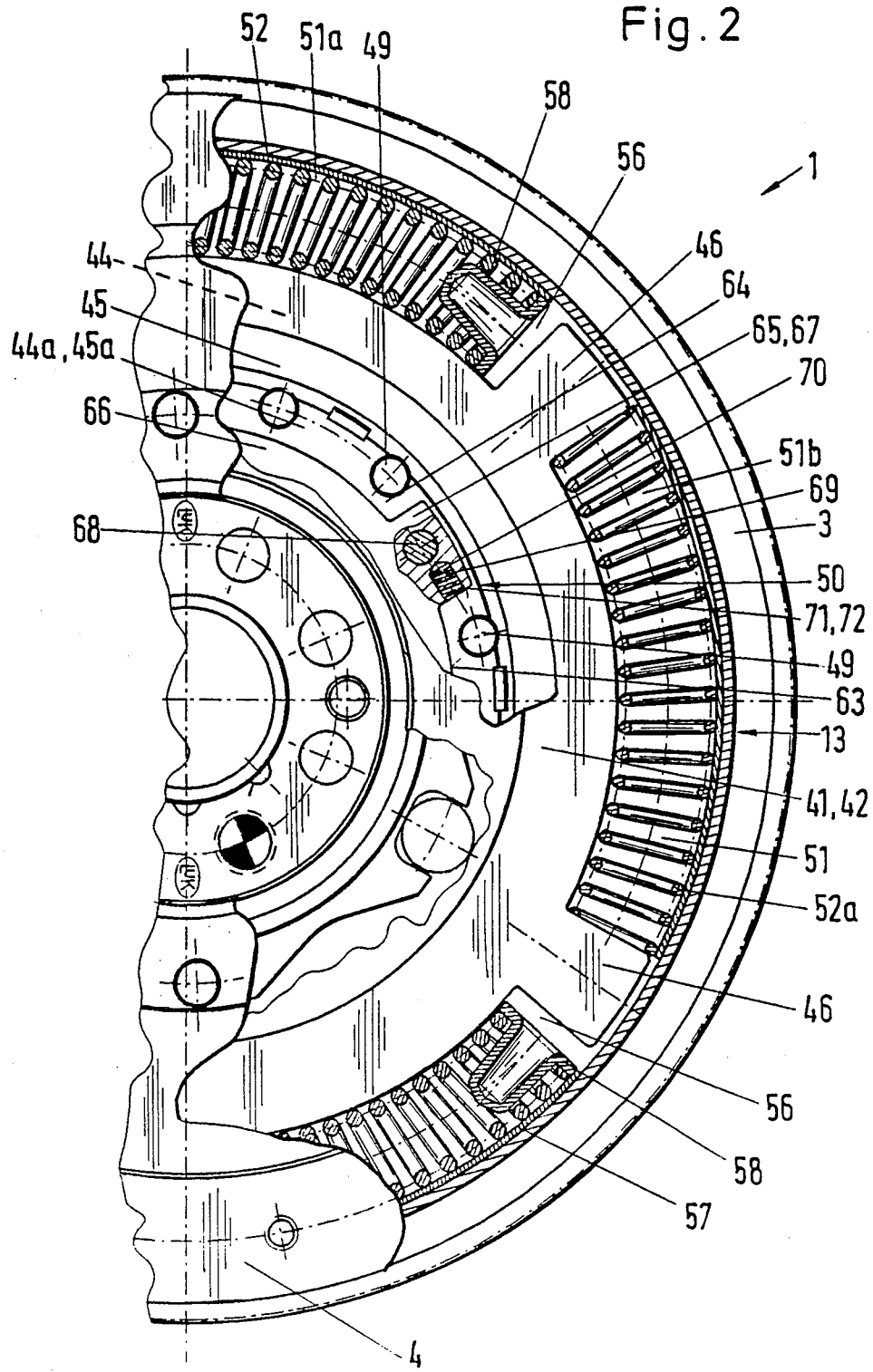
FIG. 2 is a fragmentary elevational view as seen in the direction of arrow II in FIG. 1, with certain parts shown in section taken in a plane which is to the plane of FIG. 1.

FIGS. 1 and 2 show a vibration damping apparatus 1 which serves to compensate for shocks or abrupt changes of angular movement of a composite flywheel 2 in the power train between the output member (e.g., a crankshaft) of an internal combustion engine and the input member 10 (e.g., an externally splined shaft) of a variable-speed transmission in a motor vehicle. The composite flywheel 2 comprises a first flywheel 3 which is connectable (e.g., by an annulus of bolts receivable in axially parallel bores 3A) to the output member of the engine, and a second flywheel 4 which is coaxial with the flywheel 3 and is connectable, preferably by a friction clutch 7, to the input member 10 of the transmission. Reference may be had to commonly owned U.S. Pat. No. 4,732,250 granted Mar. 22, 1988 to Maucher et al.

The illustrated friction clutch 7 includes a housing or cover 11 which is secured to the flywheel 4 by bolts or in any other suitable way so that it shares all angular movements of this flywheel, a pressure plate 8 which is axially movably installed between the cover 11 and the flywheel 4 and is non-rotatably connected to the cover, a clutch plate 9 which is interposed between the pressure plate 8 and the flywheel 4, and a diaphragm spring 12 which normally biases the pressure plate 8 against the clutch plate 9 so that the latter is urged against and receives torque from the flywheel 4 as long as the clutch 7 remains engaged. The hub of the clutch plate 9 is non-rotatably secured to the input member 10 of the transmission. When the clutch 7 is to be disengaged, the radially inwardly extending prongs 12a of the diaphragm spring 12 are caused to move axially of the clutch 7 toward the flywheels 3, 4 so that the pressure upon the plate 8 decreases and the flywheel 4 is free to rotate relative to the clutch plate 9. This interrupts the power train between the engine and the transmission.

The flywheels 3, 4 can rotate relative to each other about a common axis, and the apparatus 1 further comprises an antifriction ball bearing 15 which is installed between the two flywheels.

The flywheel 3 includes a housing composed of two substantially dished sections 31, 32 defining an annular chamber 30 for a damper 13 forming part of a vibration damping device which further includes a slip clutch 43. The radially outermost portions of the sections 31, 32 are sealingly connected to each other to prevent leakage of a supply of viscous liquid (e.g., a lubricant of greasy or pasty consistency). The sections 31, 32 are or can be made of sheet metal, and the means for sealing the radially outermost portion of the chamber 30 comprises a welded seam 38 which is provided between or close to the radially outermost portions of the sections 31 and 32. The seam 38 can establish a reliable mechanical connection between the sections 31, 32 while simultaneously preventing escape of viscous liquid from the radially outermost portion of the chamber 30. This seam can be formed in a welding machine which operates with laser beams, in an electron beam welding machine or in a machine wherein the contacting parts of sections 31, 32 are acted upon by a-c current of high strength and low potential to heat the contacting parts to welding temperature and to bond the thus heated parts to each other in response to the application of required pressure.

The section 32 of the housing which defines the chamber 30 is disposed between the flywheel 4 and the section 31 which latter has a centrally located protuberance 20 extending in a direction away from the engine and being surrounded by the antifriction bearing 15 which, in turn, is surrounded by the flywheel 4. The section 31 is actually assembled of two parts, namely the aforementioned protuberance 20 and a radially extending portion 31a. The portion 31a is centered on a peripheral surface 20b of the protuberance 20. A disc-shaped retainer 22 is affixed to the righthand end face of the protuberance 20 (as seen in FIG. 1) to locate the inner race of the antifriction bearing 15 between itself and a peripheral shoulder of the protuberance 20.

The section 31 is surrounded by and is rotatably connected to a ring-shaped starter gear 40 which is centered by the peripheral surface 39 of the portion 31a.

The thickness of the section 31 is greater than that of the section 32. A sealing device 34 is provided for the radially inner portion of the chamber 30; this device operates between the radially inner portion of the section 32 of the flywheel 3 and the flywheel 4.

The chamber 30 further accommodates a friction generating device 35 which operates between the flywheels 3 and 4. The device 35 surrounds the protuberance 20 of the flywheel 3 and is disposed axially between the antifriction bearing 15 and the radially extending portion 31a of the section 31.

The output element 41 of the damper 13 is a flange which is installed axially between the sections 31, 32 of the flywheel 3. This flange is force-lockingly connected with the flywheel 4 by way of the slip clutch 43. The latter is adjacent the radially inner main section or portion 42 of the flange 41. More specifically, the flange 41 is installed axially between two substantially disc-shaped annular stressing members 44, 45 which constitute the output element of the slip clutch 43. The flange 41 is a diaphragm spring which is stressed in the axial direction of the flywheels 3, 4 between a radially outer annular portion 44b of the stressing member 44 and a radially outer annular portion of the stressing member 45. Prior to being installed in the space between the stressing members 44 and 45, the flange 41 resembles a hollow conical frustum which is typical of a diaphragm spring.

As can be best seen in FIG. 2, the flange 41 includes the aforementioned circumferentially complete washer-like main section or portion 42, and projections in the form of arms 46 which extend radially outwardly from and beyond the main section 42. When it is properly installed between the stressing members 44 and 45, the originally frustoconical flange or diaphragm spring 41 is flattened as a result of axial stressing while its annular portion 42a abuts the stressing member 44 and its annular portion 42b abuts the stressing member 45. The annular portion 42b is located radially inwardly of the annular portion 42a. The embodiment of the improved vibration damping apparatus which is shown in FIGS. 1 and 2 further comprises a first friction lining 47 between the stressing member 44 and the flange 41, and a second friction lining 48 between the flange 41 and the stressing member 45. At least one of the friction linings 47, 48 can be replaced with an integral corrugation provided on the respective stressing member 44, 45 and having a convex surface directly abutting the respective side of the flange 41. It is also possible to replace the friction lining 47 and/or 48 with two or more corrugations of the stressing member 44 and/or 45. Such corrugation or corrugations are of advantage if it is desirable to establish a direct metal-to-metal (e.g., steel-to-steel) contact between the flange 41 and the stressing member 44 and/or 45. It is further possible to replace the friction lining 47 and/or 48 with one or more corrugations of the flange 41. The illustrated friction linings 47 and 48 are form-lockingly or otherwise (e.g., adhesively) non-rotatably connected to the respective stressing members 44 and 45.

The outer diameter of the stressing member 44 exceeds the outer diameter of the stressing member 45. This can be readily seen in FIG. 1. The stressing member 44 extends substantially radially between the section 31 and the flange 41, and the stressing member 45 extends (at least in part radially) between the flange 41 and the section 32. Those portions of the stressing members 44, 45 which extend radially inwardly of the flange 41 are axially offset toward each other and are non-rotatably affixed to one another by an annulus of rivets 49 or by analogous fastener means. These rivets ensure that the portions 44a, 45a of the stressing members 44, 45 actually abut each other.

As mentioned above, the stressing members 44, 45 constitute the output element of the slip clutch 43 and they are non-rotatably but axially movably secured to the flywheel 4 by an axial plug-in coupling 50.

The radially outermost portion 51 of the chamber 30 (inwardly adjacent the welded seam 38) is an annular compartment which receives the aforementioned radially outwardly extending projections or legs 46 of the flange 41 and further receives energy storing elements in the form of circumferentially extending coil springs 52 and 52a which form part of the damper 13. The projections 46 alternate with the coil springs 52, 52a and divide the compartment 51 into arcuate sections or subcompartments 51a, 51b each of which receives one of the springs 52, 52a. Each projection 46 constitutes an abutment for the adjacent coil spring 52 or 52a.

The major part of the compartment 51 is formed by two arcuate internal grooves 53, 54 which are respectively provided in the sections 31 and 32 of the housing defining the chamber 30 and forming part of the flywheel 3. The grooves 53, 54 define those portions of the compartment 51 which extend axially of the flywheels 3, 4 beyond the respective sides of the flange 41 and its projections 46. The making of grooves 53, 54 is rather simple (i.e., it is not necessary to resort to a material removing operation) because the sections 31, 32 are made of metallic sheet material which can be shaped in a stamping, embossing, upsetting or like machine. A portion of each coil spring 52, 52a extends into the adjacent arcuate portion of the groove 53, into the adjacent arcuate portion of the groove 54, and into the space or window between the respective projections 46 of the flange 41.

FIG. 1 shows that the curvature of surfaces bounding the grooves 53, 54 conforms to the curvature of the respective coil springs 52, 52a. This ensures that the radially outermost portions of such surfaces can serve as stops and as guide means for the radially outermost portions of convolutions of the coil springs 52, 52a. The springs 52, 52a tend to bulge radially outwardly under the action of centrifugal force when the flywheels 3 and 4 are driven to rotate at an elevated speed. In order to reduce the likelihood of, or to prevent, undesirable wear upon the surfaces bounding the radially outermost portions of the grooves 53, 54, the apparatus 1 can further comprise an arcuate shroud or shield 57 which is made of a hard metallic or other suitable material and is installed in the radially outermost portion of the compartment 51 to be contacted by convolutions of the coil springs 52, 52a when the flywheels 3 and 4 are driven so that the coil springs are acted upon by centrifugal force. The shroud 57 can constitute a lining for the surfaces bounding the radially outermost portions of the compartment 51 along an arc of up to 180° (as seen in the circumferential direction of the coil springs 52 and 52a).

The end convolutions of the coil springs 52, 52a are also engaged by abutments 56, 56a which are integral parts of the sections 31, 32 and are disposed in pairs, each pair flanking a projection 46 of the flange 41. The abutments 56, 56a extend into the respective grooves 53, 54 and cooperate with the projections 46 to stress the coil springs 52, 52a when the flange 41 is caused to turn relative to the flywheel 3 and/or vice versa.

As can be seen in FIG. 2, (which shows the initial or starting positions of the flywheels 3 and 4 relative to each other, the points of engagement of projections 46 of the flange 41 and abutments 56, 56a of the sections 31, 32 with the coil springs 52 are angularly offset relative to each other in the circumferential direction of the flywheels 3, 4 but the projections and abutments are not angularly offset with respect to the coil springs 52a.

FIG. 2 further shows cupped inserts 58 which are introduced into the ends of coil springs 52 and are adjacent the projections 46 and adjacent abutments 56, 56a. The maximum cross-sectional outline of each insert 58 equals or closely approximates the cross-sectional outline of the respective portion of the compartment 51.

The sections 31, 32 of the flywheel 3 respectively comprise annular portions 60, 61 which are disposed radially inwardly of the compartment 51 and confront each other across the respective portion of the chamber 30. These portions define an annular channel or passage 62 for the annular portion 42a of the main section 42 of the flange 41. The passage 62 further receives the radially outer portion 44b of the stressing member 44 and the friction lining 47 which is disposed between the main section 42 and the stressing member 44. The width of the passage 62 slightly exceeds the combined thickness of the parts which are received therein, e.g., by 0.5 to 1.5 mm. This ensures that a small clearance for the flow of viscous liquid remains at least between the main section 42 and the section 32 and/or between the stressing member 44 and the section 31.

The quantity of viscous liquid in the chamber 30 is preferably selected in such a way that at least the compartment 51 is completely filled (e.g., with a liquid in the form of a paste, such as lubricating grease) when the flywheels 3 and 4 rotate. However, it is also possible to select the quantity of viscous liquid in such a way that it only partially fills the compartment 51 when the composite flywheel 2 rotates. The cupped inserts 58 act not unlike pistons as soon as the flywheel 3 is caused to turn relative to the flywheel 4 and/or vice versa and the inserts expel some viscous liquid from the compartment 51 when the coil springs 52, 52a are caused to store additional energy while the liquid is caused to leave the arcuate sections 51a. This establishes a desirable viscous damping action.

FIG. 2 shows that the output element 44, 45 of the slip clutch 43 defines a central opening 63 bounded by an internal surface and includes radially extending first profiles 64 braced against second profiles 65 which are provided at the periphery of a disc-shaped member 66 affixed to the flywheel 4 by rivets 68. The second profiles 65 are formed by several (e.g., four) equidistant radially outwardly extending projections of the disc-shaped member 66. The profiles 64 alternate with recesses 67 in the form of tooth spaces which receive the respective second profiles 65. The rivets 68 are applied in such a way that they extend, at least in part, through the second profiles 65. The radially innermost portion of the disc-shaped member 66 cooperates with the retainer 22 to hold the antifriction bearing 15 in a selected axial position.

The first and second profiles 64, 65 together constitute the axial plug-in coupling 50. This coupling is similar to that disclosed in commonly owned U.S. Pat. No. 4,783,895 granted Nov. 15, 1988 to Reik and permits proper axial orientation of stressing members 44 and 45, and hence also of the flange 41, between the sections 31, 32 of the flywheel 3. This renders it possible to properly select the width of the passage 62 between the annular portions 60, 61 of the sections 31, 32 and the width of the aforementioned clearance(s) or gap(s) which remains or remain when the passage 62 receives selected portions of the flange 41, stressing member 44 and friction lining 47. Proper selection of the clearance or clearances is desirable and advantageous because the designer can select the intensity of the viscous damping action when the apparatus 1 is in use. Thus, the hydraulic or viscous damping action of the cupped inserts 58 can be maintained at an optimum value by the expedient of properly selecting the axial positions of mating first and second profiles 64, 65 relative to each other. In addition, the plug-in coupling 50 renders it possible to compensate for axial tolerances in the machining and/or finishing of various components having surfaces in abutment with each other.

The radially extending flanges 72 of the second profiles 65 are formed with recesses in the form of blind holes or bores 69 extending substantially circumferentially of the flywheels 3 and 4. Each of these bores or holes 69 (hereinafter called bores) receives a portion of an energy storing resilient bracing member 70 in the form of a coil spring one end of convolution of which reacts against the bottom surface in the respective bore 69 and the other end convolution of which bears against the adjacent flank 71 of the first profile 64 to brace the two sets of profiles 64, 65 in the circumferential direction of the flywheels 3 and 4. As explained above, the bores 69 are provided in the substantially radially extending flanks 71 of the second profiles 65, and each coil spring 70 bears against the substantially radially extending flank 72 of the adjacent first profile 64. FIG. 2 merely shows a single coil spring 70; however, it is within the purview of the invention to install a spring 70 in each and every second profile 65. It is further within the purview of the invention to install one or more coil springs 70 in one or more first profiles 64 (i.e., in blind bores provided therefor in certain or all flanks 72) and to have such coil springs bear against the flanks 71 of the adjacent second profiles 65. It is further possible to provide coil springs 70 in the profiles 64 and 65 in such distribution and orientation that they tend to turn the respective parts 44, 45 and 66 in opposite directions.

The force which is applied by the springs 70 suffices to ensure that the first and second profiles 64 and 65 are braced against each other in the circumferential direction of the flywheels 3 and 4 to thus reduce the likelihood of generation of noise known as chatter, rattle or clatter. In the absence of profiles 64, 65 and bracing means 70 therefor, noise would be particularly likely to develop when the engine is idling while the clutch 7 is engaged and the operator of the vehicle has not shifted into a forward or reverse gear, i.e., when no torque is transmitted by the transmission including the shaft 10. Noise which develops in the absence of the abovedescribed novel undertaking is attributable to the fact that, if the springs 70 of the bracing means for the profiles 64 and 65 were removed, the play which develops as a result of unavoidable manufacturing tolerances would invariably entail some movement of flanks 71 and 72 against and away from each other with attendant generation of noise which is characteristic of repeated and abrupt metal-to-metal contact. Repeated striking of flanks 71 and 72 against each other (in the absence of springs 70 or analogous bracing means) is attributable to non-uniformity of rotational movement of the output shaft of the engine, and such non-uniformity of rotary movement is then shared by the first flywheel 3. On the other hand, the parts including the flywheel 4 and certain components which rotate with the flywheel 4 (such as the clutch 7 inclusive of the clutch plate 9, the input shaft 10 and the parts (mainly gears) rotating with the input shaft 10) exhibit a certain amount of inertia which is another cause of rattling or like noise if the coil springs 70 are removed.

In order to reliably avoid the generation of rattling or like noise, it is desirable to select the bracing moment, which is established by the coil springs 70 between the profiles 64 and 65, in such a way that it at least equals but preferably exceeds (a) the moments which can develop as a result of variations of angular velocity attributable to non-uniform rotation of the output element of the engine, and (b) the moment of inertia of the flywheel 4, clutch 7 and the input shaft 10 in engaged condition of the clutch. It is preferred to install the coil springs 70 between the first and second profiles 64, 65 in such a way that they are stressed (i.e., compressed) when the vehicle is coasting. In other words, those flanks of the profiles 64, 65 which transmit torque when the engine drives the input shaft 10 are urged toward each other under the bias of the coil springs 70.

The construction and assembly of the improved apparatus 1 are simplified considerably in view of the aforedescribed design of the flange 41, namely that this flange constitutes a diaphragm spring which includes portions (edge faces of the projections 46) for engagement with the coil springs 52, 52a of the circumferentially elastic damper 13, and that this flange furnishes the force which determines the magnitude of slip torque of the clutch 43 which is in series with the damper 13. The slip clutch 43 can be designed in such a way that the flange 41 actually constitutes an element of this slip clutch, namely a friction generating component as actually shown in FIG. 1. However, it is also possible to modify the slip clutch 43 in such a way that the flange 41 merely applies the force which is necessary to maintain the friction generating elements (such as discs, rings, laminations or the like) in frictional engagement with each other, i.e., the flange 41 need not necessarily be installed in such a way that it is in direct frictional engagement with one or more parts which are rotatable relative thereto or vice versa.

Figure 3:
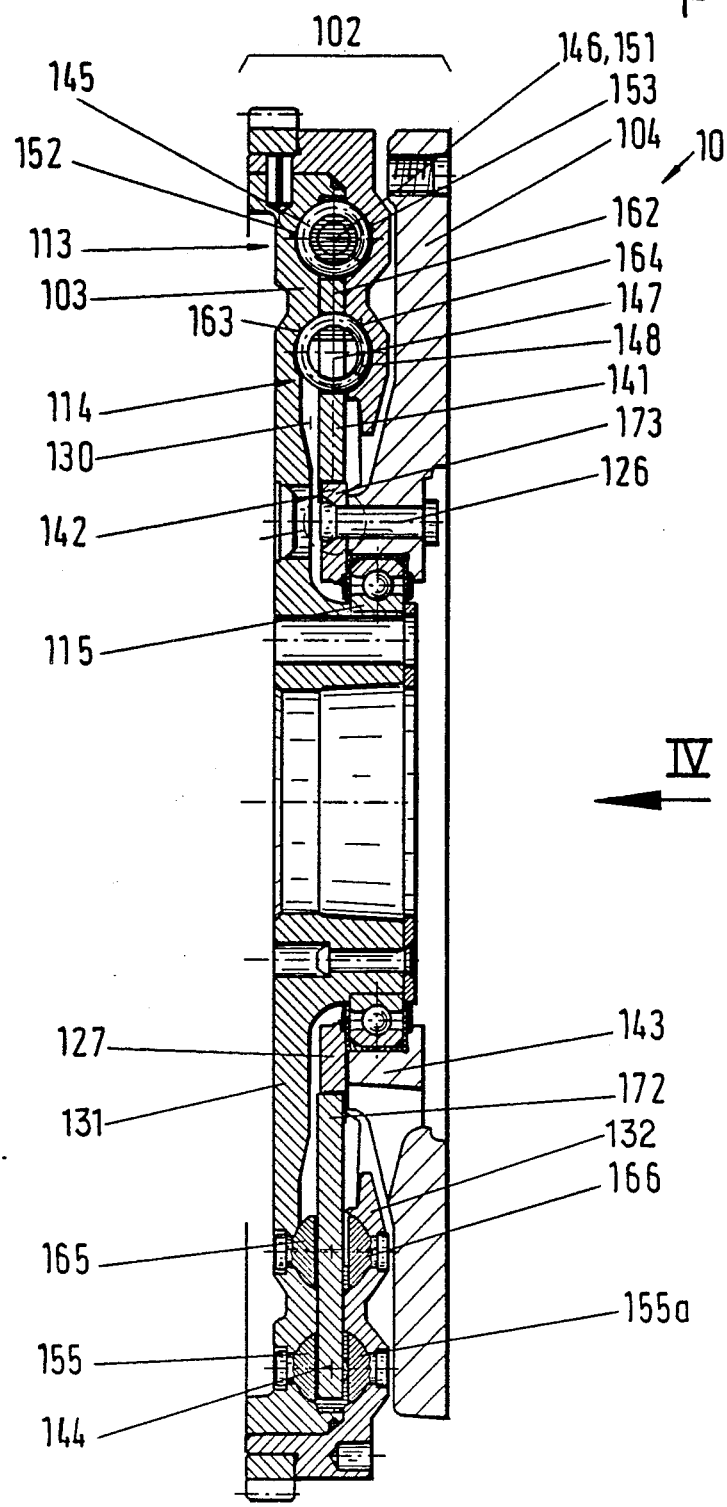
FIG. 3 is a fragmentary axial sectional view of a modified vibration damping apparatus.
Figure 4:
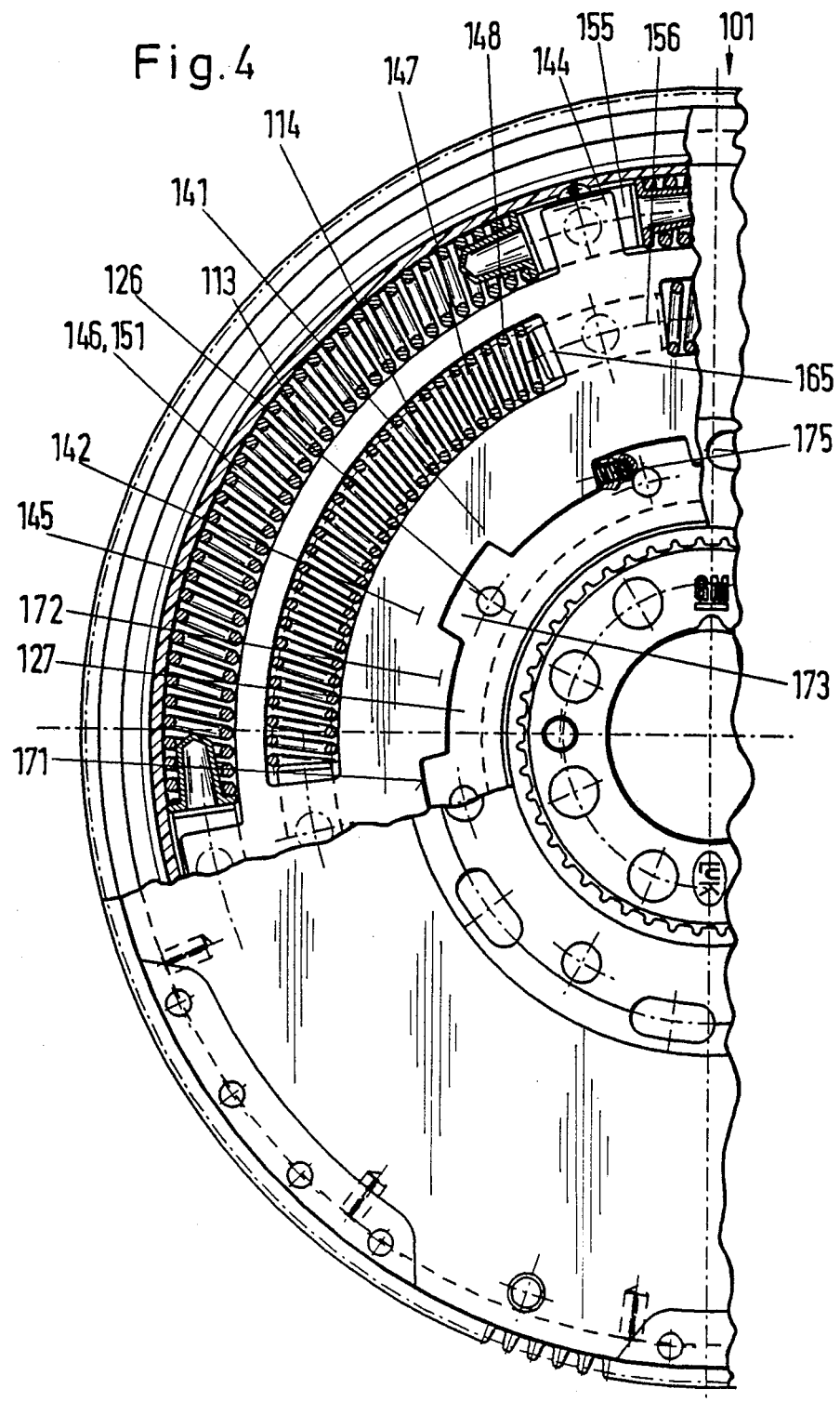
FIG. 4 is a fragmentary elevational view as seen in the direction of arrow IV in FIG. 3, with portions shown in section taken in a plane extending at right angles to the plane of FIG. 3.

The vibration damping apparatus 101 which is shown in FIGS. 3 and 4 comprises a composite flywheel 102 including discrete flywheels 103, 104. The flywheels 103 and 104 can turn relative to each other against the opposition of a first (radially outer) damper 113 and a second (radially inner) damper 114 which is connected in parallel with the damper 113. An antifriction bearing 115 is installed between the periphery of an axial protuberance of the flywheel 103 and the internal surface bounding an axial recess in the flywheel 104.

The flywheel 103 includes or constitutes a housing composed of two disc-shaped or shell-shaped sections 131, 132 each of which is a metallic casting. The sections 131, 132 define an annular chamber 130 for a supply of viscous liquid, such as a paste or grease.

The dampers 113, 114 are installed in the chamber 130 and have a common output element 141 in the form of a radially extending flange which is disposed axially between the sections 131, 132 of the flywheel 103. An axial plug-in coupling 142 is provided between the radially inner portion of the flange 141 and a disc-shaped member 127. The member 127 is secured (by rivets 126) to an axial protuberance 143 of the flywheel 104 (this protuberance defines the aforementioned recess for the antifriction bearing 115).

The flange 141 comprises projections 144 in the form of arms which extend radially outwardly beyond the circumferentially complete portion of the flange and alternate with the energy storing coil springs 145 of the outer damper 113. The coil springs 145 are received in part in windows 146 which alternate with the projections 144 and constitute arcuate recesses each of which is open at its radially outer end.

Each window 146 is located radially outwardly of a second arcuate window 147 for an arcuate energy storing coil spring 148 of the inner damper 114. Those portions (156) of the flange 141 which alternate with the arcuate windows 147 constitute abutments for the coil springs 148 of the inner damper 114.

The radially outermost portion of the chamber 130 is an annular compartment 151 which receives the projections 144 of the flange 141 and the coil springs 145 of the outer damper 113. The major part of the compartment 151 is formed by two substantially mirror symmetrical grooves 152, 153 which are provided in confronting sides of the sections 131, 132. The groove 152 receives those portions of the coil springs 145 which extend axially beyond one side of the flange 141, and the groove 153 receives those portions of the springs 145 which project beyond the other side of the flange.

The sections 131, 132 are provided with aligned projections 155, 155a which constitute abutments for the adjoining end convolutions of the coil springs 145. The projections 155, 155a cooperate with the projections 144 to ensure that the springs 145 store energy (or additional energy) when the flywheel 103 is caused to turn relative to the flywheel 104 and/or vice versa. The projections 155, 155a respectively extend into the grooves 152, 153 of the corresponding sections 131, 132.

The width of the channel or passage 162 between the sections 131, 132 is somewhat greater than the thickness of that portion of the flange 141 which is received in this passage to thus ensure that development of a relatively narrow clearance or gap at one or both sides of the flange.

The sections 131, 132 are provided with additional grooves 163, 164 which are located radially inwardly of the grooves 152, 153 and receive portions of the coil springs 148 forming the energy storing means of the inner damper 114, namely those portions of springs 148 which extend axially beyond the respective sides of the flange 141 radially inwardly of the passage 162. The sections 131, 132 are further formed with pairs of aligned projections 165, 166 which extend into the respective grooves 163, 164 and serve as abutments for adjoining portions of the coil springs 148. The projections 165, 166 cooperate with the portions 156 of the flange 141 to cause the coil springs 148 to store energy (or to store additional energy) when the flywheel 103 is caused to change its angular position relative to the flywheel 104 and/or vice versa.

The viscous liquid in the chamber 130 is preferably a lubricant, e.g., silicon oil or grease. The quantity of confined liquid is or can be selected in such a way that, when the composite flywheel 102 rotates, the compartment 151 is at least partially filled with liquid, e.g., to a level including the axes of the coil springs 145 forming part of the outer damper 113. It is presently preferred to ensure that the compartment 151 is completely filled with viscous liquid when the flywheel 103 rotates, i.e., when the liquid is urged radially outwardly under the action of centrifugal force.

FIG. 4 shows that the flange 141 has a centrally located opening 171 bounded by an internal surface provided with radially inwardly extending first profiles 172 which are in mesh with second profiles 173 and form therewith the aforementioned axial plug-in coupling 142. The second profiles 173 are provided at the periphery of the disc-shaped member 127 which is riveted to the flywheel 104, as at 126. The profiles 172 and 173 permit proper orientation of the flange 141 between the sections 131 and 132 to thus ensure that the width of the clearance or clearances forming part of the passage 162 can be maintained at an optimum value, i.e., at a value which ensures the establishment of a highly satisfactory viscous damping action. The width of the clearance or clearances can be held at a minimum without risking a jamming or clamping of the flange 141 in the passage 162.

The coupling 142 further includes bracing means composed of one or more coil springs 175 which act between the profiles 172 and 173 to thus reduce the likelihood of rattling or other undesirable noise, especially when the engine is idling, the clutch is engaged and the operator of the vehicle has not shifted into a forward or reverse gear. The coil springs 175 can be mounted in a manner as described in connection with FIGS. 1 and 2, and they urge the neighboring radial flanks of the profiles 172, 173 against each other in the circumferential direction of the composite flywheel 102. Though FIG. 4 merely shows a single coil spring 175, the bracing means of the coupling 142 can have two or more coil springs or other resilient bracing means. The spring or springs 175 can be installed in blind bores which are provided in the flanks of the second profiles 173 and/or in the flanks of the first profiles 172.

The magnitude of bracing torque which is generated by the profiles 64, 65 or 172, 173 under the action of coil spring(s) 70 or 175 depends on a plurality of parameters, such as the characteristics of the running engine (especially the degree of non-uniformity of rotation of the engine which drives the flywheel 3 or 103) and the nature and mode of operation of the transmission which is driven by the flywheel 4 or 104. It is presently preferred to select the bracing torque in such a way that it is not less than 5 Nm but can reach a value as high as 30 Nm. In most instances, the bracing torque which develops between the profiles 64, 65 or 172, 173 will be in the range of 8 to 20 Nm.

FIGS. 1 to 4 show bracing means in the form of coil springs (70 and 175) which can be said to form part of the respective axial plug-in couplings 50 and 142. However, it is equally possible to provide bracing means employing one or more block-shaped bodies of rubber or other elastically deformable material and/or one or more leaf springs and/or combinations of two or more different elastic bracing members.

Figure 5:
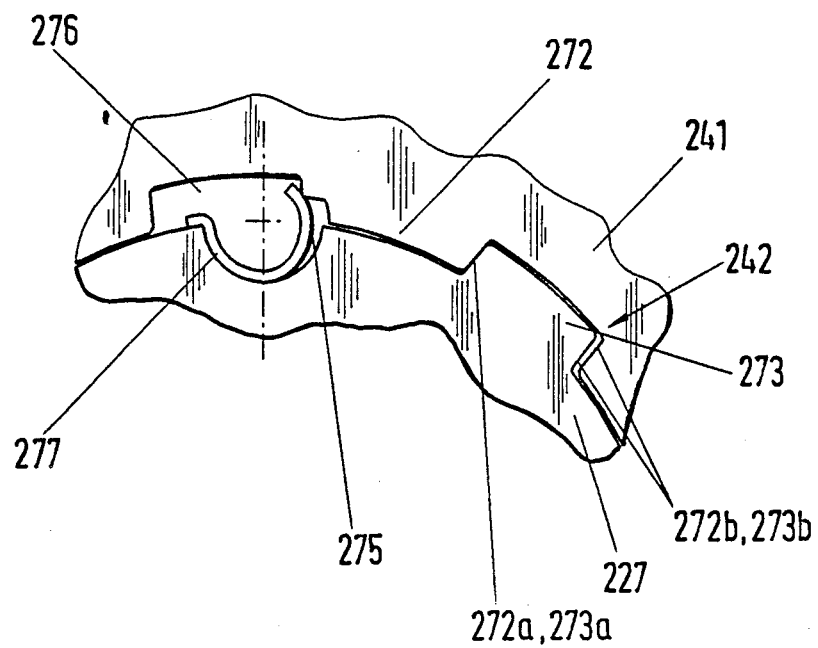
FIG. 5 a detail in a third vibration damping apparatus.

It is also within the purview of the invention to brace the first and second profiles of the coupling 50 or 142 against each other by springs or like bracing members which are not necessarily installed between neighboring flanks of the first and second profiles, i.e., the bracing members need not be provided in regions where the second profiles 65 or 173 transmit torque to the first profiles 64 or 172 or vice versa. Reference may be had to FIG. 5 which shows resilient bracing members 277 in the form of clasp-type springs operating between a flange 241 and a disc-shaped member 227. The plug-in coupling 242 of FIG. 5 comprises first profiles 272 on the flange 241 and second profiles 273 on the disc-shaped member 227 (i.e., on the second flywheel). The torque transmitting means of the profiles 272, 273 includes their radial flanks 272a, 273a and 272b, 273b (depending upon the direction of rotation of the flange 241). The bracing members 277 (only one such bracing member is actually shown in FIG. 5) are installed in recesses 276 provided in the radially innermost portion of the flange 241 and adjoining recesses 275 in the radially outermost portion of the disc-shaped member 227. The configuration of surfaces bounding the recesses 275, 276 is selected in such a way that a properly inserted bracing member 277 urges the flange 241 and the member 227 in opposite directions in order to brace the flanks 272a and 273a against each other. If desired, the configuration of the recesses 275, 276 can be altered so that each modified recess is bounded by a substantially semicircular surface; this renders it possible to employ bracing members in the form of slotted or coiled cylindrical springs or spring-type straight dowel pins.

An important advantage of the improved vibration damping apparatus, and more particularly of the improved plug-in axial coupling, is that noise is reduced or eliminated in an extremely simple and efficient way, namely by the simple expedient of providing bracing means which prevents a rattling of the first and second profiles during any stage of operation of the apparatus. In other words, the bracing means prevents the first profiles from repeatedly impacting against the second profiles and/or vice versa during each and every stage of operation of the engine and in each and every condition of the clutch and variable-speed transmission, i.e., even when the engine is idling and the clutch is engaged but the input element of the transmission does not transmit torque to the wheels and/or any other parts of the motor vehicle. The aforediscussed selection of the bracing torque even further ensures considerable reduction or complete elimination of rattling, clattering and/or other types of noise. The parts which receive torque from the input shaft of the transmission can include gears and/or other masses which contribute to inertia of the unit including the second flywheel 4 or 104 and of the parts that are driven by this flywheel. It has been found that a bracing torque in the range of 14 Nm is highly satisfactory to ensure that the coupling 50, 142 or 242 produces little noise or no noise at all. The configuration and mounting of the bracing members (such as 70, 175 or 277) should be such that the force which are generated thereby will have a component in the circumferential direction of the flywheels in order to ensure that the flanks of neighboring first and second profiles can be permanently urged against each other during each and every stage of operation of the engine, clutch and variable-speed transmission.

The input element of the damper 13 or 113 can constitute the flywheel 3 or 103 or a part which receives torque from this flywheel.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for damping vibrations in the power train between an engine and an input component of a transmission in a motor vehicle, comprising a first flywheel connectable with the engine; a second flywheel connectable with the input component, particularly by way of a friction clutch, said flywheels being angularly movable relative to each other; and vibration damping means operating between said flywheels and comprising at least energy storing means arranged to store energy in response to angular movement of at least one of said flywheels relative to the other of said flywheels, an input element, an output element, and plug-in means for non-rotatably but axially movably coupling one of said elements with one of said flywheels, said coupling means including first profiles, second profiles adjacent said first profiles, and means for bracing said first and second profiles against each other in the circumferential direction of said flywheels.

2. The apparatus of claim 1, wherein the bracing moment is greater than (a) the moments which are generated as a result of variations of angular velocity due to non-uniformity of rotary movement of the engine and (b) the moment of inertia of the second flywheel.

3. The apparatus of claim 1, wherein the bracing moment of said coupling means is greater than (a) the moments which develop as a result of changes of angular velocity due to non-uniformity of rotary movement of the engine and (b) the combined moment of inertia of the second flywheel and of the parts which share angular movements of the second flywheel.

4. The apparatus of claim 3, wherein said parts include the friction clutch, the input component of the transmission and the masses which rotate with the input component.

5. The apparatus of claim 1, wherein said coupling means has a bracing moment in the range of 5 to 30 Nm.

6. The apparatus of claim 5, wherein said bracing moment is in the range of 8 to 20 Nm.

7. The apparatus of claim 1, wherein said bracing means includes energy storing members disposed in the regions between said first and second profiles.

8. The apparatus of claim 1, wherein said first and second profiles have substantially radially extending flanks.

9. The apparatus of claim 8, wherein said bracing means includes energy storing members disposed in the regions of said flanks.

10. The apparatus of claim 1, wherein said output element includes a flange having a centrally located opening and a surface surrounding said opening and bounding said first profiles.

11. The apparatus of claim 1, wherein said second profiles are carried by said second flywheel.

12. The apparatus of claim 1, wherein said vibration damping means further comprises a substantially disc-shaped member which is connected with the other of said flywheels and has a peripheral portion, said second profiles being provided on said peripheral portion.

13. The apparatus of claim 1, wherein said output element includes means for stressing said energy storing elements.

14. The apparatus of claim 1, wherein said vibration damping means includes a damper which is elastic in the circumferential direction of said flywheels and a slip clutch in series with said damper, said output element constituting the output element of said slip clutch and said first profiles being carried by said output element.

15. The apparatus of claim 1, wherein said first profiles include first radial projections and said second profiles include second radial projections mating with said first projections.

16. The apparatus of claim 15, wherein at least one of at least one of said first and second projections has a socket and said bracing means comprises an energy storing member in said socket.

17. The apparatus of claim 16, wherein said at least one projection has a substantially radial flank and said socket is provided in the region of said flank.

18. The apparatus of claim 16, wherein said socket includes a hole or bore extending substantially circumferentially of said flywheels, said energy storing member comprising a coil spring.

19. The apparatus of claim 18, wherein said at least one projection has a bottom surface in said socket, said coil spring reacting against said bottom surface and bearing against the projection which is adjacent said at least one projection.

20. The apparatus of claim 1, wherein said first and second profiles have flanks which tend to bear against each other when the motor vehicle is coasting and said bracing means includes means for urging said flanks apart.

21. The apparatus of claim 1, wherein said first and second profiles have flanks which transmit torque between said first and second profiles when the engine drives said flywheels, said bracing means including means for urging said flanks against each other.

22. The apparatus of claim 1, wherein said bracing means are provided in said second profiles.

23. The apparatus of claim 1, wherein said bracing means are provided in said first profiles.

* * * * *